(12) United States Patent
Kim et al.

(10) Patent No.: US 9,851,850 B2
(45) Date of Patent: Dec. 26, 2017

(54) TOUCH PANEL AND TOUCHSCREEN DEVICE INCLUDING THE SAME

(71) Applicant: SAMSUNG ELECTRO-MECHANICS CO., LTD., Suwon (KR)

(72) Inventors: Hyun Jun Kim, Suwon (KR); Tah Joon Park, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 576 days.

(21) Appl. No.: 14/187,892

(22) Filed: Feb. 24, 2014

(65) Prior Publication Data

US 2015/0177872 A1 Jun. 25, 2015

(30) Foreign Application Priority Data

Dec. 24, 2013 (KR) .................. 10-2013-0162036

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04112* (2013.01)

(58) Field of Classification Search
CPC .................. G06F 3/044; G06F 3/0416; G06F 2203/04112; G01D 5/2405; G01B 7/003
See application file for complete search history.

(56) References Cited

U.S. PATENT DOCUMENTS

| | | | |
|---|---|---|---|
| 8,405,633 B2 | 3/2013 | Geaghan | |
| 2009/0273577 A1* | 11/2009 | Chen | G06F 3/044 345/174 |
| 2010/0044122 A1* | 2/2010 | Sleeman | G01D 5/2405 178/18.06 |
| 2012/0162141 A1* | 6/2012 | Maki | G06F 3/044 345/175 |
| 2013/0314109 A1* | 11/2013 | Kremin | G01R 27/2605 324/686 |
| 2014/0054070 A1* | 2/2014 | Ichiki | G06F 3/044 174/253 |
| 2014/0118641 A1* | 5/2014 | Ryu | G06F 3/044 349/12 |
| 2015/0212537 A1* | 7/2015 | Cok | G06F 3/046 345/174 |
| 2015/0324024 A1* | 11/2015 | Hwang | G06F 3/041 345/173 |

FOREIGN PATENT DOCUMENTS

KR  10-2012-0018059  2/2012

\* cited by examiner

*Primary Examiner* — Benjamin C Lee
*Assistant Examiner* — Robert Michaud
(74) *Attorney, Agent, or Firm* — NSIP Law (57) ABSTRACT

There are provided a touch panel and a touchscreen device including the same. The touch panel includes: a substrate; a plurality of first electrodes disposed on a lower surface of the substrate and extending in a first direction; and a plurality of second electrodes disposed on an upper surface of the substrate and extending in a second direction intersecting with the first direction, wherein the first and second electrodes include mesh-like conductive lines, a width of the second electrodes is wider than a width of the first electrodes, and a pitch of conductive lines of the second electrodes is greater than a pitch of conductive lines of the first electrodes.

16 Claims, 11 Drawing Sheets

TOUCH PANEL AND TOUCHSCREEN DEVICE INCLUDING THE SAME

CROSS-REFERENCE TO RELATED APPLICATION

This application claims the benefit of Korean Patent Application No. 10-2013-0162036 filed on Dec. 24, 2013, with the Korean Intellectual Property Office, the disclosure of which is incorporated herein by reference.

BACKGROUND

The present disclosure relates to a touch panel and a touchscreen device including the same.

A touchscreen device such as a touchscreen or a touch pad is a data input device attached to a display device so as to provide an intuitive user interface, and has recently been widely applied to various electronic devices such as cellular phones, personal digital assistants (PDA), and a navigation devices. Particularly, as demand for smartphones has recently increased, touchscreens have been increasingly employed as devices able to provide users with various methods of data input in a limited form factor.

Touchscreens used in portable devices may be mainly divided into resistive type touchscreens and capacitive type touchscreens, depending on the manner in which touches are sensed therein. Capacitive type touchscreens have the advantages of a relatively long lifespan and ease of implementation of various data input schemes and gestures, and thus capacitive type touchscreens have been increasingly employed. The implementation of a multi-touch interface is particularly easy in capacitive type touchscreens, as compared to resistive type touchscreens, and thus, capacitive type touchscreens are widely used in devices such as smartphones and the like.

Capacitive type touchscreens include a plurality of electrodes having a predetermined pattern and the electrodes define a plurality of nodes in which changes in capacitance are generated due to touches. The nodes deployed on a two-dimensional plane generate changes in self-capacitance or changes in mutual-capacitance due to touches. Coordinates of the touches may be calculated by applying a weighted average calculation method or the like to the changes capacitance formed in the nodes.

In existing touch panels, sensing electrodes for sensing touches are commonly formed of indium tin oxide (ITO). In the case of ITO, however, indium is a rare-earth element and is thus relatively expensive, such that it is not cost competitive. Further, world indium reserves are expected to be depleted within the next decade, and thus, a stable supply of indium may not be readily available. For these reasons, research into forming an electrode using opaque fine conductive lines is on-going. Electrodes formed using fine conductive lines formed of a material such as metal are advantageous in that it has much better electric conductivity than ITO or conductive polymer and it is easily available.

Recently, applications that allow touchscreen devices to detect a stylus pen or various types of gesture have being developed to allow for greater user convenience. To this end, an electrode structure capable of detecting minute changes in capacitance is required.

RELATED ART DOCUMENT (Patent Document 1) U.S. Pat. No. 8,405,633

SUMMARY

An aspect of the present disclosure may provide a touch panel in which the width of first electrodes disposed on the lower surface of a substrate is narrower than the width of second electrodes disposed on the upper surface of the substrate, and the pitch of conductive lines of the first electrodes is smaller than the pitch of conductive lines of the second electrodes, and a touchscreen device including the same.

According to an aspect of the present disclosure, a touch panel may include: a substrate; a plurality of first electrodes disposed on a lower surface of the substrate and extending in a first direction; and a plurality of second electrodes disposed on an upper surface of the substrate and extending in a second direction intersecting with the first direction, wherein the first and second electrodes include conductive lines formed in a mesh pattern, a width of the second electrodes is wider than a width of the first electrodes, and a pitch of conductive lines of the second electrodes is greater than a pitch of conductive lines of the first electrodes.

The width of the second electrodes may be equal to two times the width of the first electrodes.

The touch panel may further include: a plurality of dummy electrodes respectively disposed between the first electrodes.

The pitch of the conductive lines of the second electrodes may be equal to two to three and half times the pitch of the conductive lines of the first electrodes.

The dummy electrodes may include mesh-like conductive lines having the same pattern and pitch as those of the conductive lines of the first electrodes.

The dummy electrodes may be formed in such a manner that mesh-like unit cells are arranged in the first direction while being connected to one another at intersections between the conductive lines as connecting points.

The dummy electrodes may be formed in such a manner that mesh-like unit cells are arranged in the first direction while being separated from one another.

The lines extended from the conductive lines of the dummy electrodes may coincide with the first electrodes.

According to another aspect of the present disclosure, a touchscreen device may include: a panel unit including a plurality of first electrodes disposed on a lower surface of a substrate and extending in a first direction, and a plurality of second electrodes disposed on an upper surface of the substrate and extending in a second direction intersecting with the first direction; and a control unit applying driving signals to the plurality of first electrodes and detecting capacitance from the plurality of second electrodes so as to determine whether a touch has occurred, wherein the first and second electrodes include conductive lines formed in a mesh pattern, a width of the second electrodes is wider than a width of the first electrodes, and a pitch of conductive lines of the second electrodes is greater than a pitch of conductive lines of the first electrodes.

The width of the second electrodes may be equal to two times the width of the first electrodes.

The panel unit may further include: a plurality of dummy electrodes respectively disposed between the first electrodes.

The pitch of the conductive lines of the second electrodes may be equal to two to three and half times the pitch of the conductive lines of the first electrodes.

The dummy electrodes may include mesh-like conductive lines having the same pattern and pitch as those of the conductive lines of the first electrodes.

The dummy electrodes may be formed in such a manner that mesh-like unit cells are arranged in the first direction while being connected to one another at intersections between the conductive lines as connecting points.

The dummy electrodes may be formed in such a manner that mesh-like unit cells are arranged in the first direction while being separated from one another.

The lines extended from the conductive lines of the dummy electrodes may coincide with the first electrodes.

According to another aspect of the present disclosure, a touchscreen device may include: a panel unit including a plurality of first electrodes disposed on a lower surface of a substrate and extending in a first direction, and a plurality of second electrodes disposed on an upper surface of the substrate and extending in a second direction intersecting with the first direction; and a control unit applying driving signals to a portion of electrodes near one end of one of the plurality of first electrodes or the plurality of second electrodes, and detecting capacitance from a portion of electrodes near the other end thereof so as to determine whether a touch has occurred, wherein the first and second electrodes include conductive lines formed in a mesh pattern, a width of the second electrodes is wider than a width of the first electrodes, and a pitch of conductive lines of the second electrodes is greater than a pitch of conductive lines of the first electrodes.

According to another aspect of the present disclosure, a touch panel may include: a substrate; mesh-like conductive lines disposed on a lower surface of the substrate; and mesh-like conductive lines disposed on an upper surface of the substrate, wherein the conductive lines disposed on the lower surface of the substrate are divided into a plurality of conductive regions and a plurality of non-conductive regions, and the conductive regions and the non-conductive regions cut through intersections between the conductive lines disposed on the lower surface of the substrate to extend in a first direction, the conductive lines disposed on the upper surface are divided into a plurality of conductive regions, and the conductive regions disposed on the upper surface cut through intersections between the conductive lines disposed on the upper surface to extend in a second direction, a width of the conductive regions disposed on the upper surface is wider than a width of the conductive regions disposed on the lower surface of the substrate, and a pitch of the conductive lines disposed on the upper surface is greater than a pitch of the conductive lines disposed on the lower surface of the substrate.

The width of the conductive regions disposed on the upper surface may be equal to two times the width of the conductive regions disposed on the lower surface of the substrate.

The pitch of the conductive lines disposed on the upper surface may be equal to two to three and half times the pitch of the conductive lines disposed on the lower surface of the substrate.

The non-conductive regions disposed on the lower surface of the substrate may be formed in such a manner that mesh-like unit cells are arranged in the first direction while being connected to one another at intersections between the conductive lines as connecting points.

The non-conductive regions disposed on the lower surface of the substrate may be formed in such a manner that mesh-like unit cells are arranged in the first direction while being separated from one another.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

Figure 1:
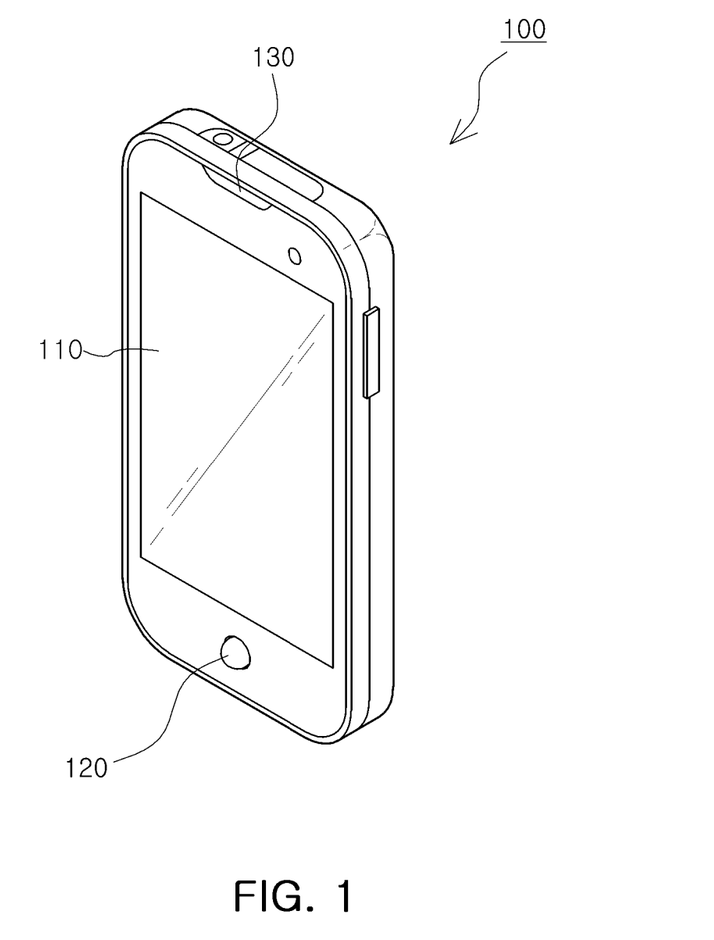
FIG. 1 is a perspective view illustrating an appearance of an electronic device including a touchscreen device according to an exemplary embodiment of the present disclosure.

FIG. 1 is a perspective view illustrating an appearance of an electronic device including a touchscreen device according to an exemplary embodiment of the present disclosure.

Referring to FIG. 1, the electronic device 100 according to the present embodiment may include a display device 110 outputting images from a display device, an input unit 120, an audio output unit 130 outputting sound, and a touch sensing device integrated with the display device 110.

As illustrated in FIG. 1, it is common in mobile devices that a touchscreen device is integrated with a display device, and such a touchscreen device needs to have a degree of light transmittance sufficiently high to allow an image displayed on the display device to be viewed therethrough. Accordingly, such a touchscreen device may be implemented by forming an electrode with a conductive material on a transparent substrate formed of a film such as polyethylene terephthalate (PET), a polycarbonate (PC), polyethersulfone (PES), a polyimide (PI), polymethylmethacrylate (PMMA), a cyclo-olefin polymer (COP), soda glass, or tempered glass. In a bezel area of the display device, wiring patterns connected to electrodes formed of an electrically conductive material are arranged, and the wiring patterns are shielded by the bezel area so that they are not visible.

Since the touchscreen device according to the exemplary embodiment is a capacitive type touchscreen device, the touchscreen device may include a plurality of electrodes having a predetermined pattern. Further, the touchscreen device may include a capacitance sensing circuit to sense changes in capacitance generated in the plurality of electrodes, an analog-digital converting circuit to convert an output signal from the capacitance sensing circuit into a digital value, and a calculating circuit to determine if a touch has occurred, based on the converted data of the digital value.

Figure 2:
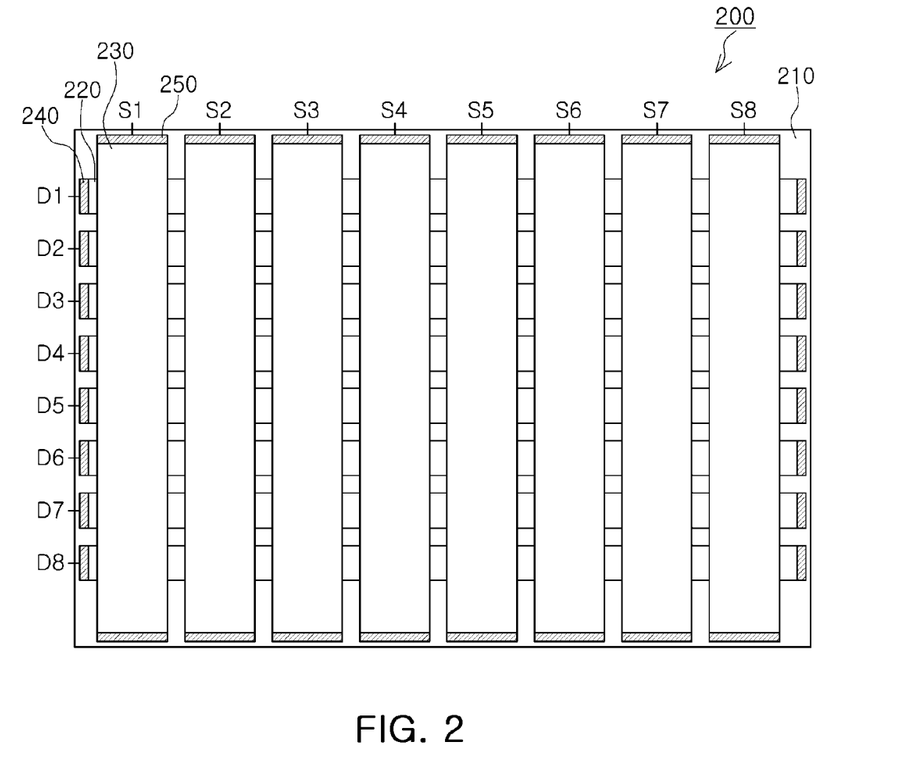
FIG. 2 is a view of a touch panel included in a touchscreen device according to an exemplary embodiment of the present disclosure.

FIG. 2 is a view of a touch panel included in a touchscreen device according to an exemplary embodiment of the present disclosure.

Referring to FIG. 2, a touch panel 200 according to the exemplary embodiment may include a substrate 210, a plurality of electrodes 220 and 230 provided on the substrate 210, and a plurality of pads 240 and 250 connected to the plurality of electrodes 220 and 230, respectively. Although not illustrated in FIG. 2, the plurality of pads 240 and 250 connected to the plurality of electrodes 220 and 230, respectively, may be electrically connected to a wiring pattern on a circuit board attached to one end of the substrate 210 through a wiring and a bonding pad. The circuit board may have a controller integrated circuit mounted thereon so as to detect sensing signals generated in the plurality of electrodes 220 and 230 and may determine whether a touch has occurred based on the detected sensing signals.

The substrate 210 may be a transparent substrate on which the plurality of electrodes 220 and 230 are to be formed. Accordingly, as described above, the substrate 210 may be formed of films formed of a material such as polyethylene terephthalate (PET), polycarbonate (PC), polyethersulfone (PES), a polyimide (PI), polymethylmethacrylate (PMMA), a cyclo-olenfin polymer (COP), soda glass, or tempered glass.

The plurality of electrodes 220 and 230 may include first electrodes 220 extending in the x-axis direction, and second electrodes 230 extending in the y-axis direction. The first electrodes 220 and the second electrodes 230 may be provided on both surfaces of the substrate 210 or may be provided on different substrates 210 such that they may intersect with each other. If all of the first electrodes 220 and the second electrodes 230 are provided on one surface of the substrate 210, an insulating layer may be partially formed at intersection points between the first electrodes 220 and the second electrodes 230. Alternatively, the first electrodes 220 and the second electrodes 230 may be provided on different surfaces so as to intersect each other, as will be appreciated.

In the regions in which a plurality of pads 240 and 250, connecting to the plurality of electrodes 220 and 230, are provided, other than the region in which the plurality of electrodes 220 and 230 are formed, a printed region may be formed in a region of the substrate 210 so as to hide the wiring typically formed of an opaque metal material.

A device, electrically connected to the plurality of electrodes 220 and 230 to sense a touch, detects changes in capacitance generated in the plurality of electrodes 220 and 230 by a touch, to allow the touch to be sensed, based on the detected change in capacitance. The first electrodes 220 may be connected to channels defined as D1 to D8 in the controller integrated circuit to receive predetermined driving signals, and the second electrodes 230 may be connected to channels defined as S1 to S8 to be used by the touch sensing device to detect a sensing signal. Here, the controller integrated circuit may detect changes in mutual-capacitance generated between the first and second electrodes 220 and 230 as the sensing signal, in a such manner that the driving signals are sequentially applied to the first electrodes 220 and changes in capacitance in the second electrodes 230 are simultaneously detected.

Figure 3:
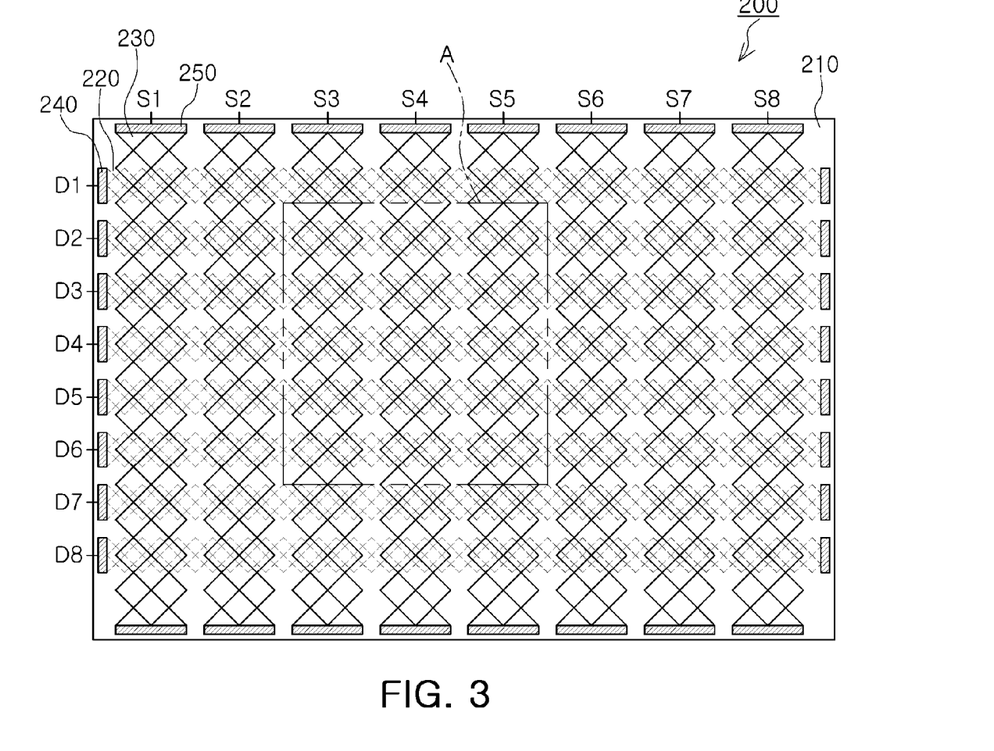
FIG. 3 is a view illustrating the touch panel according to the exemplary embodiment shown in FIG. 2 in more detail.

FIG. 3 is a view illustrating the touch panel according to the exemplary embodiment illustrated in FIG. 2 in more detail. Referring to FIG. 3, the plurality of electrodes 220 and 230 may include conductive lines, which may have a net or mesh pattern. By forming the conductive lines in a net or mesh pattern, patterning marks previously shown in regions in which indium-tin oxide (ITO) electrodes exist, may be less visible, and transparency of the touch panel may be improved.

Although the plurality of conductive lines configuring the plurality of electrodes 220 and 230 is formed in a diamond pattern or a quadrangular pattern in FIG. 3, it is apparent that the pattern of the plurality of conductive lines is not limited thereto but may be formed in any pattern that would be obvious to, or easily conceived of by, those skilled in the art, such as a hexagonal pattern, an octagonal pattern, a diamond pattern and a random pattern.

The conductive lines configuring the plurality of electrodes 220 and 230 may be formed of one of Ag, Al, Cr, Ni, Mo, and Cu or an alloy thereof. By forming the plurality of electrodes 220 and 230 with metal, the resistance value of the electrodes may be reduced to thereby improve conductivity and detection sensitivity.

Figure 4:
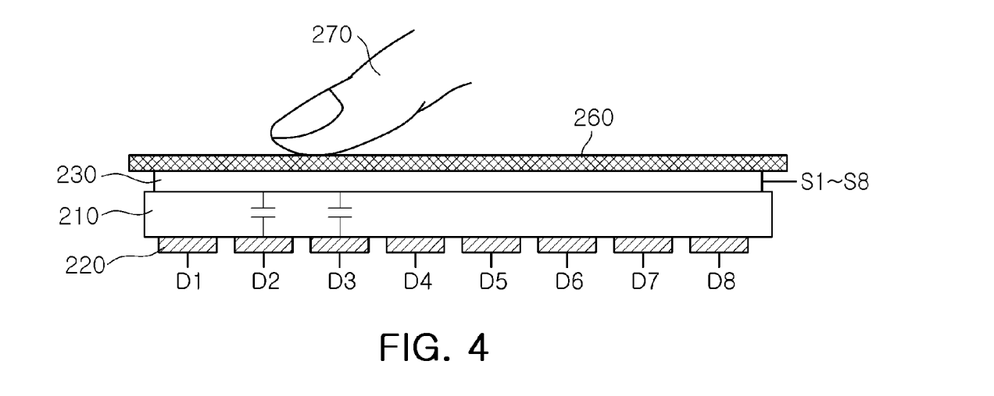
FIG. 4 is a cross-sectional view of the touch panel shown in FIGS. 2 and 3.

FIG. 4 is a cross-sectional view of the touch panel illustrated in FIGS. 2 and 3, in which a cover lens 260 to receive a touch may be further included, in addition to the substrate 210, the plurality of electrodes 220 and 230, and the plurality of pads 240 and 250 (not shown in FIG. 4) described above with respect to FIGS. 2 and 3. The cover lens 260 may be provided on the first electrodes 220 used for detecting sensing signals, to receive a touch from a touching object 270, such as a finger.

When driving signals are sequentially applied to the first electrodes 220 through channels D1 to D8, mutual-capacitance is generated between the first electrodes 220, to which the driving signals are applied, and the second electrodes 230. When the driving signals are sequentially applied to the first electrodes 220, changes in mutual-capacitance occur between the first electrode 220 and the second electrode 230 adjacent to the area with which the touching object 270 comes into contact. The change in the mutual-capacitance may be proportional to the overlapped area between the region with which the touching object 270 comes into contact, and the region in which the first electrodes 220, to which the driving signals are applied, and the second electrodes 230 are provided. In FIG. 3, the mutual-capacitance generated between the first electrodes 220 connected to channel D2 and D3, respectively, and the second electrodes 230 is influenced by the touching object 270.

Figure 5:
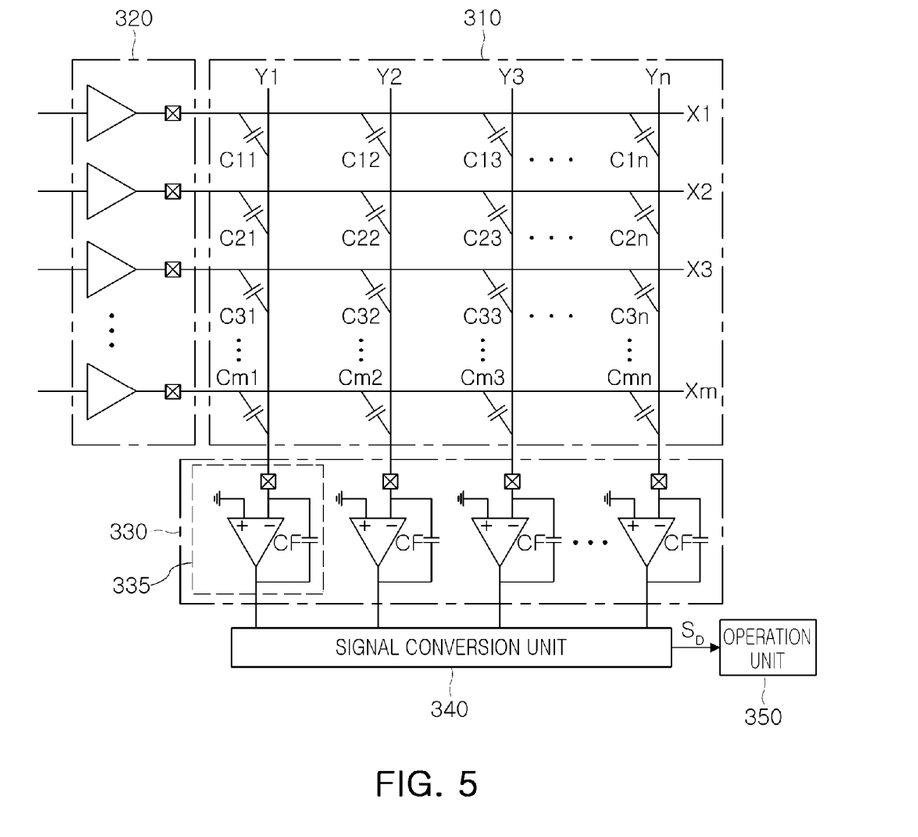
FIG. 5 is a diagram illustrating a touchscreen device according to an exemplary embodiment of the present disclosure.

FIG. 5 is a diagram illustrating a touchscreen device according to an exemplary embodiment of the present disclosure.

Referring to FIG. 5, the touchscreen device according to the exemplary embodiment may include a panel unit 310, a driving circuit unit 320, a sensing circuit unit 330, a signal conversion unit 340, and an operation unit 350. The driving circuit unit 320, the sensing circuit unit 330, the signal conversion unit 340, and the operation unit 350 may be implemented as a single integrated circuit (IC). The touchscreen device according to the exemplary embodiment may include the touch panel illustrated in FIGS. 2 through 5 as the panel unit 310 according to the exemplary embodiment.

The panel unit 310 may include rows of first electrode X1 to Xm extending in a first axial direction (that is, the horizontal direction of FIG. 5), and columns of second electrodes Y1 to Yn extending in a second axial direction (that is, the vertical direction of FIG. 5) intersecting the first axial direction. Node capacitors C11 to Cmn are the equivalent representation of mutual capacitance generated in intersections of the first electrodes X1 to Xm and the second electrodes Y1 to Yn.

The driving circuit unit 320 may apply predetermined driving signals to the first electrodes of the panel unit 310 X1 to Xm. The driving signals may be square wave signals, sine wave signals, triangle wave signals or the like, having a specific frequency and an amplitude and may be sequentially applied to each of the plurality of first electrodes X1 to Xm. Although FIG. 5 illustrates that circuits for generating and applying the driving signals are individually connected to the plurality of first electrodes X1 to Xm, it is apparent that a single driving signal generating circuit may be used to apply the driving signals to the plurality of first electrodes X1 to Xm by employing a switching circuit. In addition, the driving circuit unit 320 may apply driving signals to all of the first electrodes X1 to Xm simultaneously or to only some of the first electrodes X1 to Xm selectively, to simply determine whether a touch has occurred.

The sensing circuit unit 330 may detect capacitance of the node capacitors C11 to Cmn from the second electrodes Y1 to Yn. The sensing circuit unit 330 may include a plurality of C-V converters 335, each of which has at least one operational amplifier and at least one capacitor and is connected to the respective second electrodes Y1 to Yn.

The C-V converters 335 may convert the capacitance of the node capacitors C11 to Cmn into voltage signals so as to output analog signals. For example, each of the C-V converters 335 may include an integration circuit to integrate capacitance values. The integration circuit may integrate and convert capacitance values into a voltage value to output it.

Although the C-V converter 335 illustrated in FIG. 4 has the configuration in which a capacitor CF is disposed between the inverting input terminal and the output terminal of an operation amplifier, it is apparent that the circuit configuration may be altered. Moreover, each of the C-V converters 335 illustrated in FIG. 4 has one operational amplifier and one capacitor, it may have a number of operational amplifiers and capacitors.

When driving signals are sequentially applied to the first electrodes X1 to Xm, capacitance may be detected simultaneously from the second electrodes Y1 to Yn, and the number of required C-V converters 335 is equal to the number of the second electrodes Y1 to Yn, i.e., n.

The signal conversion unit 340 may generate digital signals $S_D$ from the analog signals output from the sensing circuit unit 330. For example, the signal converting unit 340 may include a time-to-digital converter (TDC) circuit measuring a time taken for the analog signals, in the form of voltages output from the sensing circuit unit 330, to reach a predetermined reference voltage level to convert the measured time into the digital signal $S_D$, or an analog-to-digital converter (ADC) circuit measuring an amount by which a level of the analog signals output from the sensing circuit unit 330 is changed for a predetermined time to convert the changed amount into the digital signal $S_D$.

The operation unit 350 may determine whether a touch has occurred on the panel unit 310 based on the digital signal $S_D$. The operation unit 350 may determine the number of touch inputs, coordinates of the touch inputs, and the type of gesture of the touch inputs or the like made on the panel unit 310, based on the digital signal $S_D$.

The digital signal $S_D$, which is used by the operation unit 350 to determine whether a touch has occurred, may be data that is a numerical value representing changes in capacitance of the capacitors C11 to Cmn, especially representing a difference between the capacitance with and without a touch. Typically in a capacitive type touchscreen device, a region touched by a conductive object has less capacitance than other regions not touched.

Figure 6:
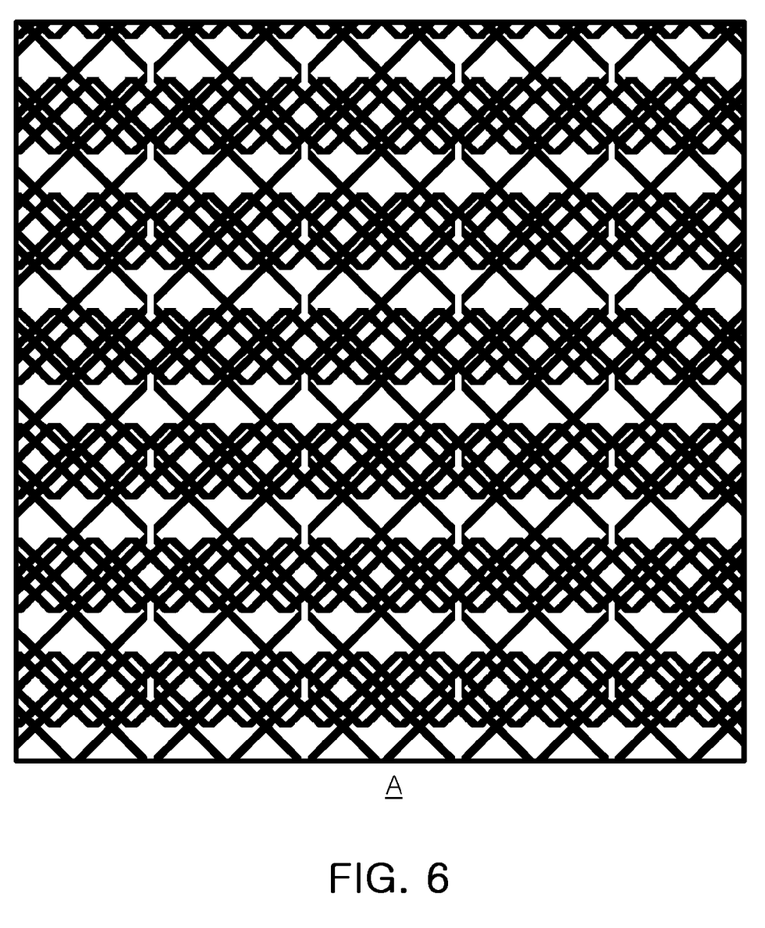
FIG. 6 is an enlarged view of region A of the touch panel illustrated in FIG. 3.
Figure 7:
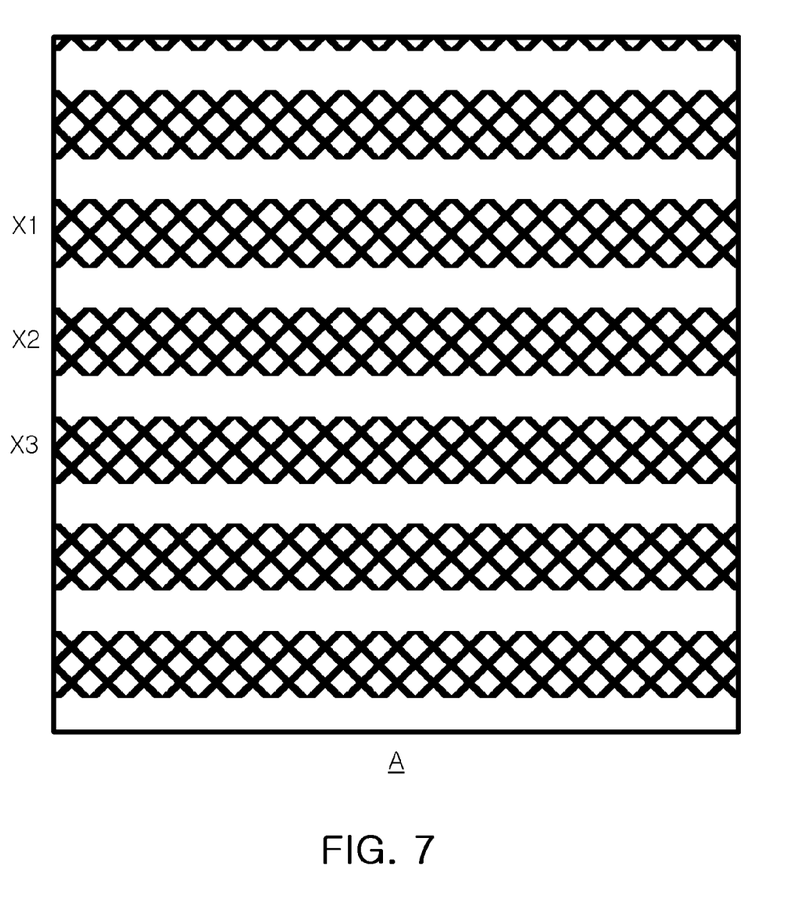
FIG. 7 is a view illustrating the first electrodes illustrated in FIG. 6.
Figure 8:
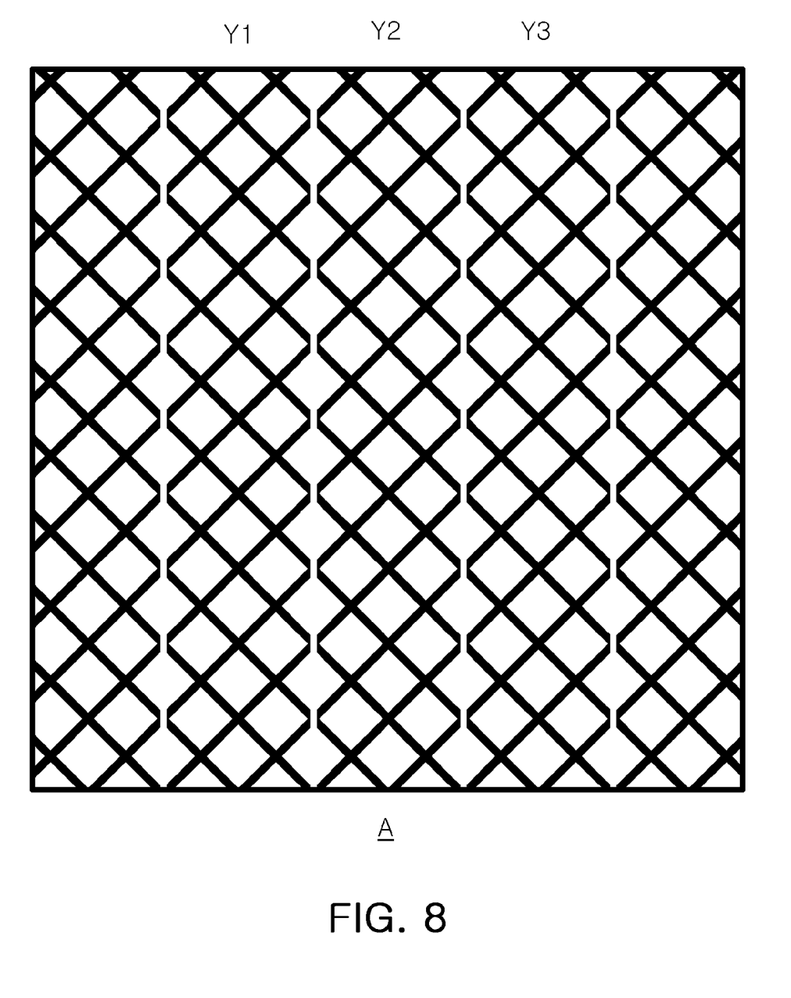
FIG. 8 is a view illustrating the second electrodes illustrated in FIG. 6.

FIG. 6 is an enlarged view of region A of the touch panel illustrated in FIG. 3, FIG. 7 is a view illustrating the first electrodes illustrated in FIG. 6, and FIG. 8 is a view illustrating the second electrodes illustrated in FIG. 6.

Referring to FIGS. 6 through 8, the width of the first electrodes provided on the lower surface of the substrate of the touch panel according to the exemplary embodiment is narrower than that of the second electrodes provided on the upper surface thereof. For example, the width of the second electrodes may be twice that of the first electrodes.

In addition, the pitch of the mesh-like conductive lines configuring the first electrodes may be shorter than that of the mesh-like conductive lines configuring the second electrodes. For example, the pitch of the mesh-like conductive lines configuring the second electrodes may be equal to two to three and half times that of the mesh-like conductive lines configuring the first electrodes.

Tables 1 to 3 illustrate simulation data of the touch panel illustrated in FIG. 6. In Comparative Examples illustrated in Tables 1 to 3, the width of the first electrodes is equal to that of the second electrodes, and the pitch of the conductive lines configuring the first electrodes is equal to that of the conductive lines configuring the second electrodes.

TABLE 1

| Note | Drive/Sense | Capacitance before Touch (Cm, pF) | Change in Capacitance after Touch (ΔCm, ΔpF) | Ratio of Change in Capacitance (%) |
|---|---|---|---|---|
| Example in FIG. 6 | X2/Y2 | 0.674 | 0.127 | 18.9 |
| Comparative Example | X2/Y2 | 0.988 | 0.152 | 15.4 |

Data in Table 1 was obtained by applying a driving signal to the first electrode X1 of the first electrodes and measuring capacitance from the first electrode Y1 of the second electrodes. It can be seen from the comparison of the Comparative Example with the Example in FIG. 6 that the changes in capacitance are 0.152 pF in the Comparative Example and 0.127 pF in the Example in FIG. 6, and thus are greater in the Comparative Example than in the Example in FIG. 6. However, the ratios of changes in capacitance are 15.4% in the Comparative Example and 18.9% in the Example in FIG. 6, and thus are greater in the Example in FIG. 6 than in the Comparative Example.

TABLE 2

| Note | Drive/Sense | Capacitance before Touch (Cm, pF) | Change in Capacitance after Touch (ΔCm, ΔpF) | Ratio of Change in Capacitance (%) |
|---|---|---|---|---|
| Example in FIG. 6 | X1/X3 | 0.542 | 0.019 | 3.5 |
| | Y1/Y3 | 0.537 | 0.024 | 4.4 |

TABLE 2-continued

| Note | Drive/ Sense | Capacitance before Touch (Cm, pF) | Change in Capacitance after Touch (ΔCm, ΔpF) | Ratio of Change in Capacitance (%) |
|---|---|---|---|---|
| Comparative Example | X1/X3 Y1/Y3 | 1.112 0.765 | 0.036 0.024 | 3.2 3.14 |

Data in Table 2 is to determine the distribution of capacitance, which may be used in detecting a proximity touch.

Data in Table 2 was obtained by applying a driving signal to the first electrode X1 of the first electrodes and measuring capacitance from the third electrode X3 of the first electrodes, or by applying a driving signal to the first electrode Y1 of the second electrodes and measuring capacitance from the third electrode Y3 of the second electrodes. A touch has occurred at a distance of 10 mm or higher from the cover lens. Referring to Table 2, the ratios of changes in capacitance are 3.2% or 3.14% in Comparative Examples and 3.5% and 4.4% in the Examples in FIG. 6, and thus, are greater than in the Examples in FIG. 6 than in the Comparative Examples. Therefore, according to the exemplary embodiment, a proximity touch may be detected with higher sensitivity.

Alternatively, when there are a plurality of first electrodes extending in a first direction and a plurality of second electrodes extending in a second direction intersecting with the first direction, driving signals may be applied to a portion of electrodes near one ends of one electrode among the pluralities of first and second electrodes, and changes in capacitance may be detected from a portion of electrodes near the other end thereof, so as to determined whether a proximity touch has occurred.

TABLE 3

| | Note | | | |
|---|---|---|---|---|
| | Examples in FIG. 6 | | Comparative Examples | |
| Electrode | X2 | Y2 | X2 | Y2 |
| Parasitic capacitance (Cp, pF) | 2.701 | 2.598 | 4.495 | 2.754 |

Data in Table 3 illustrates parasitic capacitance of the second electrode X2 of the first electrodes and the second electrode Y2 of the second electrodes in Examples in FIG. 6 and in Comparative Examples. It can be seen that parasitic capacitance values are 2.701 pF and 2.598 pF in the Examples in FIG. 6, and are 4.495 pF, 2.754 pF in the Comparative Examples, and thus parasitic capacitance was improved in the Examples in FIG. 6.

Figure 9:
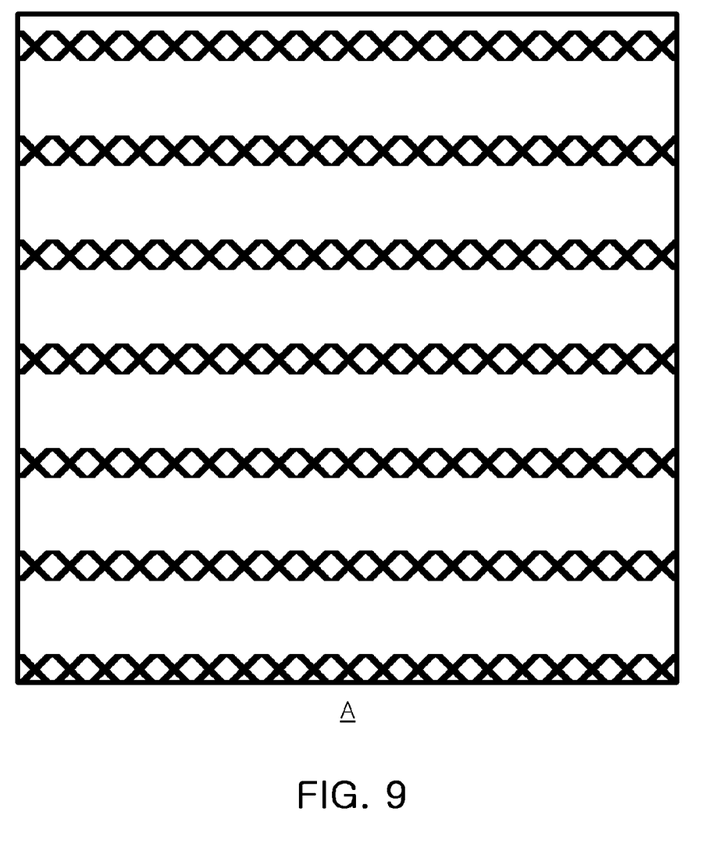
FIGS. 9 and 10 illustrate dummy electrodes according to various exemplary embodiments of the present disclosure.
Figure 10:
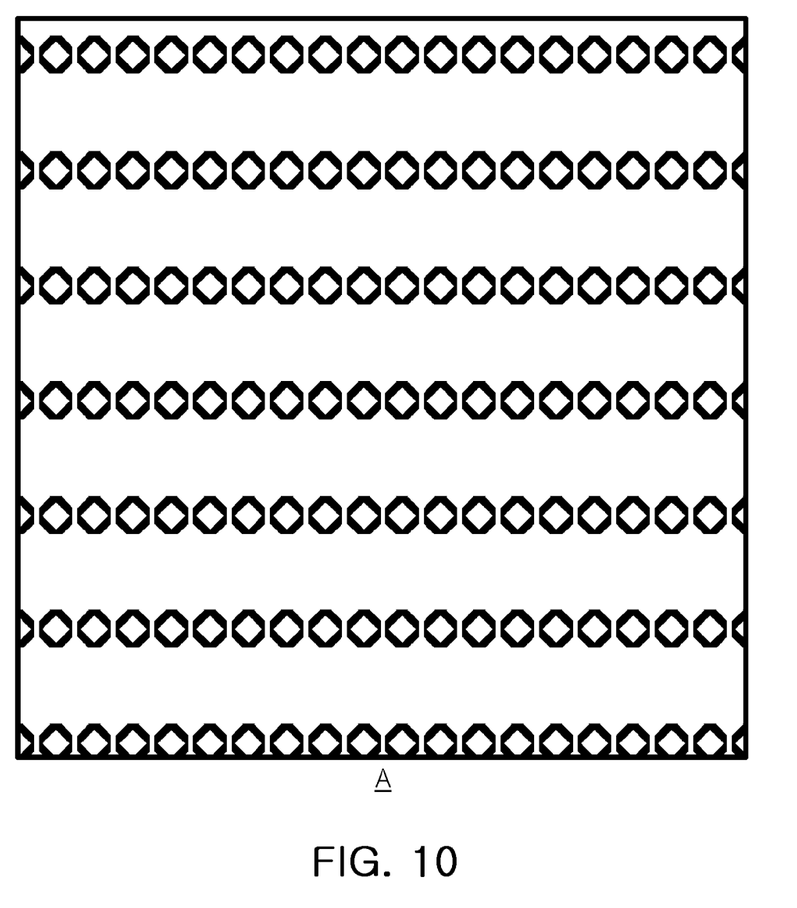

FIGS. 9 and 10 illustrate dummy electrodes according to various exemplary embodiments of the present disclosure. Hereinafter, dummy electrodes according to the exemplary embodiments of the present disclosure will be described with reference to FIGS. 7, 9 and 10.

According to an exemplary embodiment of the present disclosure, each of the dummy electrodes may be disposed between the first electrodes extending in a first direction. The dummy electrodes may be formed of conductive lines that are in a mesh pattern having the same pattern and pitch as those of the first electrodes. The dummy electrodes may be formed in such a manner that mesh-like unit cells are arranged in the first direction while being connected to one another at intersections between connecting points, as illustrated in FIG. 9, or that mesh-like unit cells may arranged in the first direction while being separated from one another, as illustrated in FIG. 10.

Figure 11:
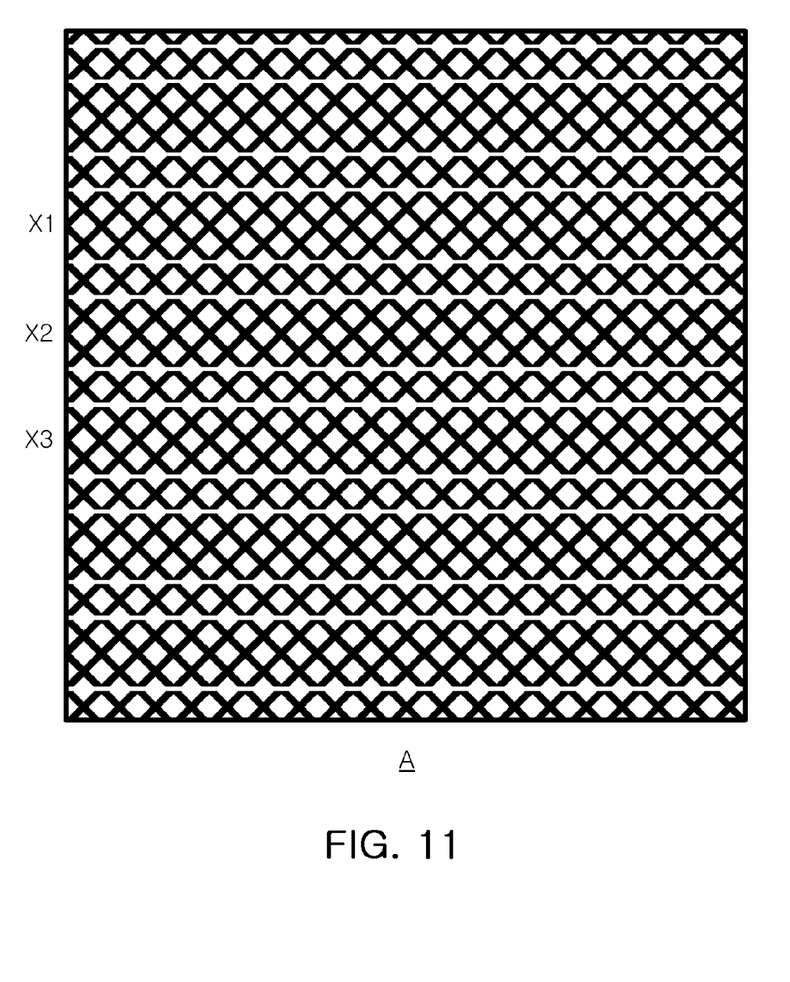
FIG. 11 is a view illustrating the first electrodes illustrated in FIG. 7 along with the dummy electrodes illustrated in FIG. 9.

FIG. 11 is a view illustrating the first electrodes illustrated in FIG. 7 along with the dummy electrodes illustrated in FIG. 9. Referring to FIG. 11, the dummy electrodes and the first electrodes may be formed by cutting through some regions of the mesh-like conductive lines. The dummy electrodes and the first electrodes may be provided by cutting through intersections between the conductive lines arranged in one direction, e.g., the first direction, among the mesh-like conductive lines to form cut through portions.

Figure 12:
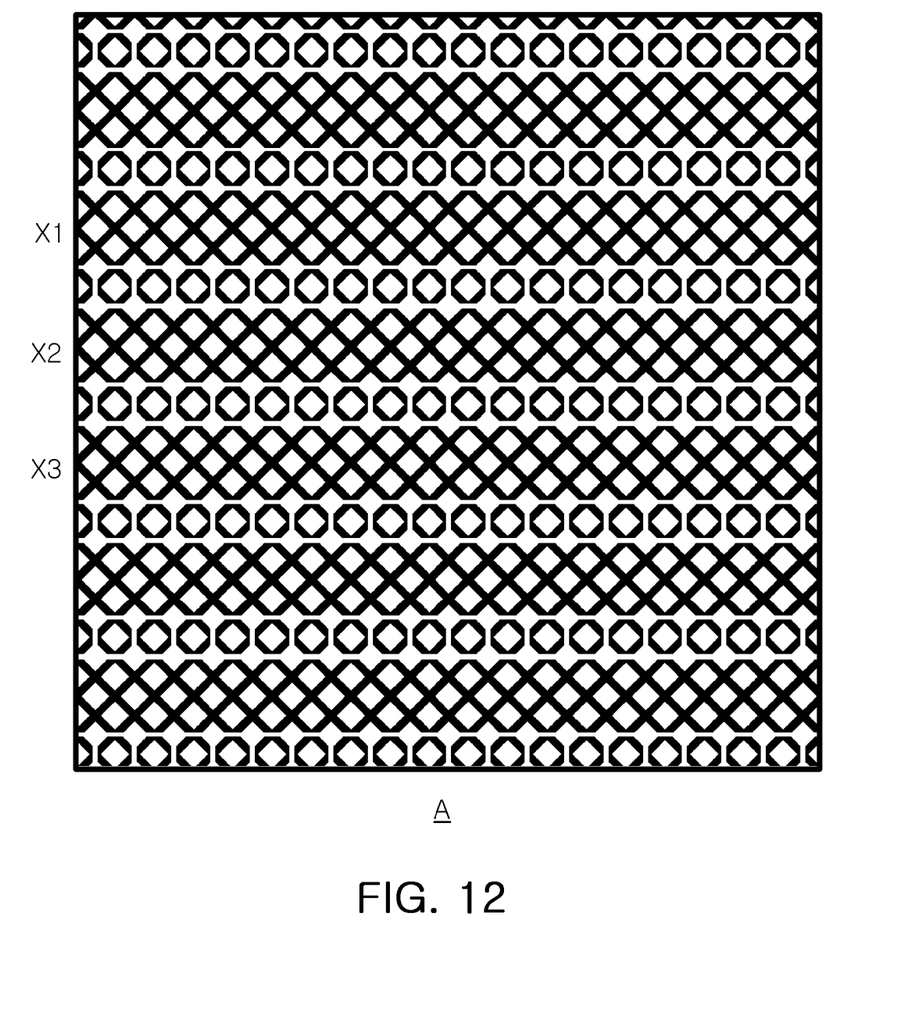
FIG. 12 is a view illustrating the first electrodes illustrated in FIG. 7 along with the dummy electrodes illustrated in FIG. 10.

FIG. 12 is a view illustrating the first electrodes illustrated in FIG. 7 along with the dummy electrodes illustrated in FIG. 10. Referring to FIG. 12, the dummy electrodes may be provided by cutting through a plurality of intersections of the conductive lines located in a second direction, among the conductive lines of the dummy electrodes illustrated in FIG. 11 to form cut through portions.

The dummy electrodes illustrated in FIGS. 11 and 12 are provided for improving visibility of the touch panel. The first electrodes are conductive regions, whereas the dummy electrodes are non-conductive regions. The lines extended from the conductive lines of the dummy electrodes may coincide with the first electrodes.

Table 4 below illustrates simulation data obtained when the electrodes illustrated in FIGS. 11 and 12 are provided on the lower surface of a substrate and the electrodes illustrated in FIG. 8 are provided on the upper surface of the substrate.

TABLE 4

| | Note | | | | | |
|---|---|---|---|---|---|---|
| | Examples in FIG. 6 | | Examples in FIG. 11 | | Examples in FIG. 12 | |
| Electrode | | | | | | |
| | X1 | Y1 | X1 | Y1 | X1 | Y1 |
| Parasitic capacitance (Cp, pF) | 2.701 | 2.598 | 2.791 | 2.888 | 2.789 | 2.636 |

Comparing Examples in FIGS. 6, 11 and 12 with one another, the parasitic capacitance at the first one X1 of the first electrodes according to Examples in FIGS. 11 and 12 is higher than the parasitic capacitance at the first one X1 of the first electrodes according to the Example in FIG. 6 due to the dummy electrodes.

Further, the parasitic capacitance in the first electrode Y1 of the second electrodes according to the Example in FIG. 11 is higher than the parasitic capacitance at the first electrode Y1 of the second electrodes, according to the Example in FIG. 6, but the parasitic capacitance in the first electrode Y1 of the second electrodes according to the Example in FIG. 12 is lower than the parasitic capacitance in the first electrode Y1 of the second electrodes, according to the Example in FIG. 11. That is, as illustrated in FIG. 12, by separating unit mesh patterns from one another so as to provide dummy electrodes between the first electrodes, parasitic capacitance may be reduced in the second electrodes.

As set forth above, according to exemplary embodiments of the present disclosure, a touch panel is provided in which the width of first electrodes disposed on the lower surface of a substrate is narrower than the width of second electrodes disposed on the upper surface of the substrate, and the pitch of conductive lines of the first electrodes is smaller than the pitch of conductive lines of the second electrodes, such that touch sensitivity may be improved and parasitic capacitance may be reduced.

While exemplary embodiments have been shown and described above, it will be apparent to those skilled in the art that modifications and variations could be made without departing from the spirit and scope of the present disclosure as defined by the appended claims.

What is claimed is:

1. A touch panel, comprising:
a substrate;
a plurality of first electrodes disposed on a lower surface of the substrate and extending in a first direction;
a plurality of second electrodes disposed on an upper surface of the substrate and extending in a second direction intersecting with the first direction; and a plurality of dummy electrodes respectively disposed between the first electrodes,
wherein the first and second electrodes include conductive lines formed in a mesh pattern a width of the second electrodes is wider than a width of the first electrodes, and a pitch of conductive lines of the second electrodes is greater than a pitch of conductive lines of the first electrodes,
wherein the first electrodes and the second electrodes, and a plurality of pads connected to the first electrodes and the second electrodes, are disposed on different regions of the substrate, wherein the width of the second electrodes is equal to two times the width of the first electrodes, and wherein the pitch of the conductive lines of the second electrodes is equal to two to three and half times the pitch of the conductive lines of the first electrodes.

2. The touch panel of claim 1, wherein the dummy electrodes includes conductive lines formed in a mesh pattern having the same pattern and pitch as those of the conductive lines of the first electrodes.

3. The touch panel of claim 2, wherein the dummy electrodes are formed in such a manner that mesh-like unit cells are arranged in the first direction while being connected to one another at intersections between the conductive lines as connecting points.

4. The touch panel of claim 2, wherein the dummy electrodes are formed in such a manner that mesh-like unit cells are arranged in the first direction while being separated from one another.

5. The touch panel of claim 2, wherein lines extended from the conductive lines of the dummy electrodes coincide with the first electrodes.

6. The touch panel of claim 1, further comprises:
a sensing circuit configured to detect capacitance of node capacitors of the second electrodes; and
a plurality of converters configured to convert the capacitance of the node capacitors.

7. The touch panel of claim 1, wherein the dummy electrodes comprise conductive lines that are in a mesh pattern having the same pattern and pitch as those of the first electrode.

8. A touchscreen device, comprising:
a panel unit including a plurality of first electrodes disposed on a lower surface of a substrate and extending in a first direction, and a plurality of second electrodes disposed on an upper surface of the substrate and extending in a second direction intersecting with the first direction; and
a control unit applying driving signals to the plurality of first electrodes and detecting capacitance from the plurality of second electrodes so as to determine whether a touch has occurred,
wherein the first and second electrodes include conductive lines formed in a mesh pattern, a width of the second electrodes is wider than a width of the first electrodes, and a pitch of conductive lines of the second electrodes is greater than a pitch of conductive lines of the first electrodes,
wherein the panel unit further includes a plurality of dummy electrodes respectively disposed between the first electrodes,
wherein the first electrodes and the second electrodes, and a plurality of pads connected to the first electrodes and the second electrodes, are disposed on different regions of the substrate,
wherein the width of the second electrodes is equal to two times the width of the first electrodes, and
wherein the pitch of the conductive lines of the second electrodes is equal to two to three and half times the pitch of the conductive lines of the first electrodes.

9. The touchscreen device of claim 8, wherein the dummy electrodes includes conductive lines formed in a mesh pattern having the same pattern and pitch as those of the conductive lines of the first electrodes.

10. The touchscreen device of claim 9, wherein the dummy electrodes are formed in such a manner that mesh-like unit cells are arranged in the first direction while being connected to one another at intersections between the conductive lines as connecting points.

11. The touchscreen device of claim 9, wherein the dummy electrodes are formed in such a manner that mesh-like unit cells are arranged in the first direction while being separated from one another.

12. The touchscreen device of claim 9, wherein lines extended from the conductive lines of the dummy electrodes coincide with the first electrodes.

13. A touchscreen device, comprising:
a panel unit including a plurality of first electrodes disposed on a lower surface of a substrate and extending in a first direction, and
a plurality of second electrodes disposed on an upper surface of the substrate and extending in a second direction intersecting with the first direction; and
a control unit applying driving signals to a portion of electrodes near one end of one of the plurality of first electrodes or the plurality of second electrodes, and
detecting capacitance from a portion of electrodes near the other end thereof so as to determine whether a touch has occurred,
wherein the first and second electrodes include conductive lines formed in a mesh pattern, a width of the second electrodes is wider than a width of the first electrodes, and a pitch of conductive lines of the second electrodes is greater than a pitch of conductive lines of the first electrodes,
wherein the panel unit further includes a plurality of dummy electrodes respectively disposed between the first electrodes,
wherein the first electrodes and the second electrodes, and a plurality of pads connected to the first electrodes and the second electrodes, are disposed on different regions of the substrate,
wherein the width of the second electrodes is equal to two times the width of the first electrodes, and wherein the pitch of the conductive lines of the second electrodes is equal to two to three and half times the pitch of the conductive lines of the first electrodes.

14. A touch panel, comprising: a substrate;
a plurality of first electrodes disposed on a lower surface of the substrate and extending in a first direction;
a plurality of second electrodes disposed on an upper surface of the substrate and extending in a second direction intersecting with the first direction; and
a plurality of dummy electrodes respectively disposed between the first electrodes;
conductive lines formed in a mesh pattern disposed on a lower surface of the substrate; and
conductive lines formed in a mesh pattern disposed on an upper surface of the substrate,
wherein the conductive lines disposed on the lower surface of the substrate are divided into a plurality of conductive regions and a plurality of non-conductive regions, the conductive regions and the non-conductive regions being arranged in a first direction with intersections between the conductive lines cut through,
wherein the conductive lines disposed on the upper surface are divided into a plurality of conductive regions, the conductive regions being arranged in a second direction with intersections between the conductive lines cut through,
wherein a width of the conductive regions disposed on the upper surface is wider than a width of the conductive regions disposed on the lower surface of the substrate,
wherein a pitch of the conductive lines disposed on the upper surface is greater than a pitch of the conductive lines disposed on the lower surface of the substrate,
wherein the first electrodes and the second electrodes, and a plurality of pads connected to the first electrodes and the second electrodes, are disposed on different regions of the substrate,
wherein the width of the conductive regions disposed on the upper surface is equal to two times the width of the conductive regions disposed on the lower surface of the substrate, and
wherein the pitch of the conductive lines disposed on the upper surface is equal to two to three and half times the pitch of the conductive lines disposed on the lower surface of the substrate.

15. The touch panel of claim 14, wherein the non-conductive regions disposed on the lower surface of the substrate are formed in such a manner that mesh-like unit cells are arranged in the first direction while being connected to one another at intersections between the conductive lines as connecting points.

16. The touch panel of claim 14, wherein the non-conductive regions disposed on the lower surface of the substrate are formed in such a manner that mesh-like unit cells are arranged in the first direction while being separated from one another.

* * * * *